United States Patent [19]
Britz et al.

[11] 3,964,928
[45] June 22, 1976

[54] LEAD-OXYGEN DC POWER SUPPLY SYSTEM HAVING A CLOSED LOOP OXYGEN AND WATER SYSTEM

[76] Inventors: William J. Britz, Huntsville; William A. Boshers, Madison; James J. Kaufmann, Huntsville, all of Ala.

[22] Filed: Dec. 27, 1974

[21] Appl. No.: 537,024

[52] U.S. Cl............................................. 136/86 A
[51] Int. Cl.²..................... H01M 8/04; H01M 8/18
[58] Field of Search......................... 136/86 A, 86 R

[56] References Cited
UNITED STATES PATENTS

| | | | |
|---|---|---|---|
| 3,359,136 | 12/1967 | Merlen et al. | 136/86 A |
| 3,507,704 | 4/1970 | Webb | 136/86 R |
| 3,532,548 | 10/1970 | Stachurski | 136/86 A |
| 3,619,297 | 11/1971 | Moran | 136/86 A |

*Primary Examiner*—John H. Mack
*Assistant Examiner*—H. A. Feeley
*Attorney, Agent, or Firm*—L. D. Wofford, Jr.; John R. Manning; Gary F. Grafel

[57] ABSTRACT

An electrical power system is provided for supplying DC power to electrically motorized vehicles, emergency standby sources, and the like wherein a lead-oxygen battery cell used as a source of DC power includes a positive charging grid, a conventional negative electrode, a positive discharging electrode, and a teflon membrane member coated with a catalyst contained in an atmosphere of oxygen which is admitted to the cell through the teflon membrane. Oxygen is given off during the charging cycle and is compressed in a storage tank for re-use during each duty cycle providing a closed system wherein contamination is minimized and a long-life cycle can result.

2 Claims, 3 Drawing Figures

LEAD-OXYGEN DC POWER SUPPLY SYSTEM HAVING A CLOSED LOOP OXYGEN AND WATER SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a pollution-free, economical, closed-loop power system using a lead-oxygen battery to supply power for lightweight vehicles and the like uses wherein a significant improvement in energy output per pound is achieved over conventional lead acid battery systems.

An important feature of the lead-oxygen system is that it is completely sealed. There are no fumes to pollute crowded areas and no sparks from exhaust systems to cause explosions in a hazardous atmosphere. These features make this system ideal for standby power in hospital operating rooms or in clean rooms where processes cannot be interrupted by power failures. Under sea exploration vehicles are an especially good candidate for this system as air pollution cannot be tolerated.

Lead-acid battery power systems are well known for their use in automobiles, submarines, fork lifts, golf-carts and the like. Lead-acid batteries have a deep discharge capability and may be recharged many times in their life cycle.

The lead-oxygen power system illustrated herein is expected to have a long life cycle exceeding that of the lead-acid system. The life cycle is expected to be enhanced by the addition of a specially designed positive charging grid electrode used only during the charging operation correcting sulfation which normally results on the conventional positive electrode causing active material to be lost due to gassing at the electrode and gradual deterioration.

Calculations show that the lead-oxygen battery system could deliver up to 35 watt-hours per pound, whereas the conventional lead-acid battery normally found in an automobile delivers about 10 to 15 watt hours per pound. This significant weight reduction is accomplished by removing the solid lead peroxide plate positive electrode and substituting a metal current collector positive grid electrode used only for discharge, a catalyst, and a teflon membrane. Oxygen is introduced into the cell through this membrane.

There is little or no regular maintenance required in the lead-oxygen power system. Oxygen is reclaimed from the positive charging grid during the charging operation and compressed in a storage tank. Water evaporated from the electrolyte is condensed out of the reclaimed oxygen and is returned to the battery cell automatically. The system is charged through an AC/DC power converter plugged into a commercial AC power line outlet, or may be charged by another DC power source.

SUMMARY OF THE INVENTION

An electrical power supply system is illustrated for supplying power to a DC electrical apparatus, such as lightweight vehicles and emergency standby power sources. The power supply system has a charging device for converting commercial AC power to DC power for charging the DC power source; and a controller connected between the charging device and the DC power source for regulating the charging current to protect the DC power source. The controller selectively connects the DC power source to the electrical apparatus for supplying power thereto. The DC power source includes a battery box containing an atmosphere of oxygen and containing at least one lead-oxygen battery cell comprising a charging grid member providing a separate positive electrode terminal for charging the cell, a conventional negative electrode providing a negative terminal, and a positive discharge electrode providing a positive terminal through which the battery is discharged. A pump evacuates oxygen released from the battery cell during the charging operation and compresses the released oxygen in a storage tank for use during the discharge operation. As the released oxygen is delivered to the storage tank a condenser is provided to cool the oxygen and cause the moisture therein to condense. The condensed moisture is accumulated and stored in an accumulator tank for later return to the electrolyte in the battery cell. Thus, a closed-loop system is provided in which water and oxygen are re-used and none is lost or contaminated. In addition, a recombination electrode is provided inside the battery cell for recombining hydrogen given off during certain operations with oxygen to form water further restoring the original water supply.

Accordingly, it is an important object of the present invention to provide a DC power supply system which is closed-loop, self-contained and maintenance free for supplying power to lightweight vehicles, emergency standby sources, lights, or any other electrical equipment.

Another important object of the present invention is to provide a DC power supply system using a lead-oxygen battery to produce higher watt-hours per pound than that of conventional battery systems.

A further object of the present invention is to provide a DC Power supply system which does not produce fumes that pollute the surrounding atmosphere for use in closed environments, such as factories, hospitals, undersea exploration vehicles, mining vehicles, emergency standby lights and power systems, and many other applications.

Still another important object of the present invention is to provide a DC power supply system which is relatively maintenance free and the oxygen used in the system is reclaimed from the positive charging grid during the charging operation and subsequently stored under pressure in a tank for re-use, and water evaporated from the electrolyte is condensed during the charging operation and is returned to the cells automatically to maintain correct electrolyte acid-water ratios and eliminate a source of contamination.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF THE PREFERRED EMBODIMENT

Figure 1:
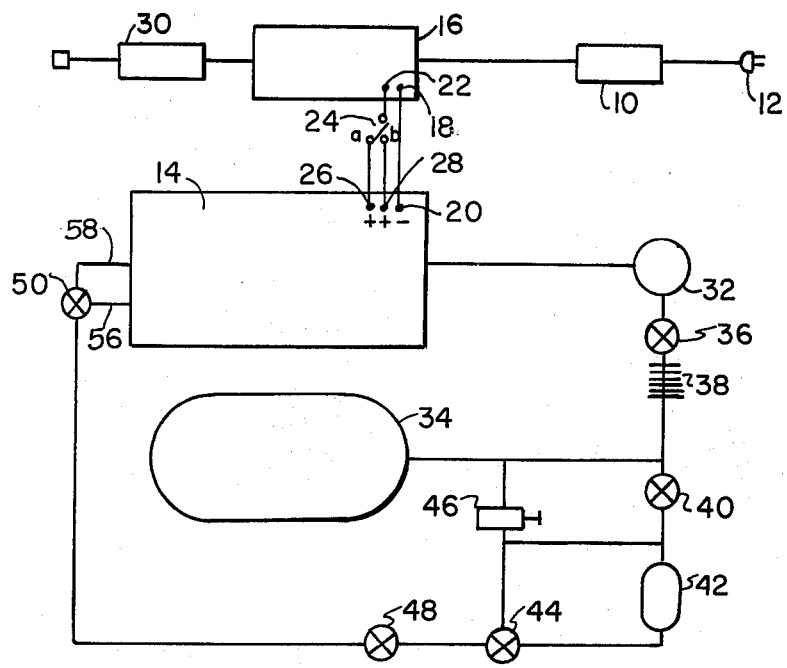
FIG. 1 is a schematic block diagram illustrating the operation of a DC power supply system constructed in accordance with the present invention.

Referring to the schematic diagram of FIG. 1, a DC power system is illustrated wherein a battery charger 10 converts a commercial AC power source 12 into DC power for charging the battery 14. A controller 16 regulates the charge current to protect the battery and controls the output voltage and current from the battery during the work cycles to provide the load torque and feed requirements within the designed parameters of the battery system. The controller 16 has a negative terminal 18 connected to negative terminal 20 of the battery. A positive terminal 22 of the controller is selectively connected by way of a two-position switch 24 to either a positive charging terminal 26 or a positive discharging terminal 28 of the battery 14. When the switch 24 is in position a, as shown, the battery is operatively connected to the battery charger 10. When the switch 24 is in position b the battery is connected by way of the controller 16 to supply power to suitable DC electrical apparatus, such as DC motor 30. A conventional pump means 32 is provided for evacuating oxygen released by the battery 14 during the charging operation which is subsequently compressed by the pump into a storage tank 34. The compressed oxygen stored in tank 34 is later returned to the battery during the discharge cycle. Connected between the pump 32 and oxygen storage tank 34 is a check valve 36 and a finned condensor 38. The fins provide the means to air cool the oxygen coming from the pump and cause the moisture in the oxygen to be condensed. A conventional valve 40 is provided for delivering the condensed moisture to a suitable water accumulator tank 42. Water which is accumulated in the tank during the charging operation is later returned to the electrolyte in the battery 14. Valve 44 is a two-way valve having a first position for delivering oxygen from the storage tank 34 to the battery 14 by way of a regulator 46, valve 44, valve 48, the first position of a two-way valve 50, and a manifold pipe 56. The valve 44 has a second position for delivering the water accumulated in tank 42 to the battery 14 by way of valve 44, valve 48, the second position of two-way valve 50, and manifold pipe 58. Regulator 46 regulates the pressure of the oxygen in the delivery lines so as to allow the oxygen pressure to convey the water stored in the water accumulator 42 to the battery when such is desired.

The controller 16 may include conventional relay switching circuitry for sequentially operating the control valves 40, 44, 48, and 50 at the appropriate moment in the operational cycle, and the control valves may be conventional relay operated solenoid valves. The controller also includes a conventional voltage regulator for protecting the battery during charging and for controlling output voltage and current during discharge as, for example, as used in an automobile system. The two-way switch 24 may be manually operated or may be switched by the controller 16 at the appropriate time if a fully automatic control system is desired. It is also possible that the system be totally manual with switch 24 and control valves 40, 44, 48, and 50 being sequentially operated by hand with the controller 16 including appropriate voltage and current visual display meters.

Figure 2:
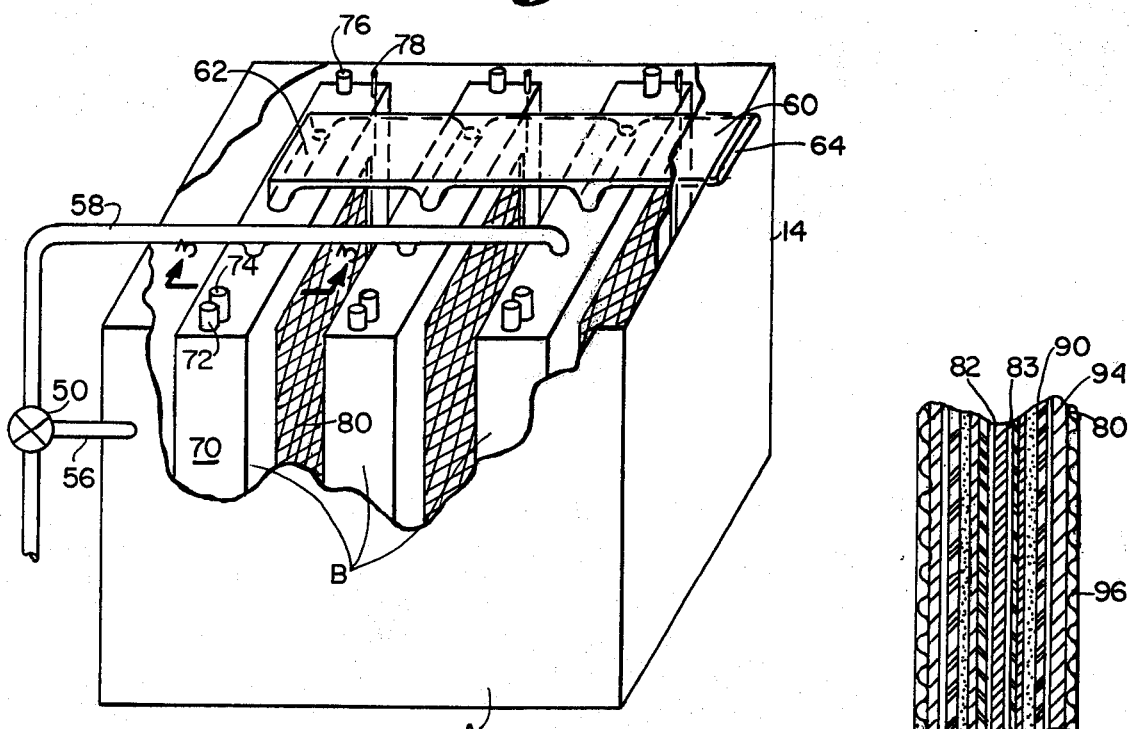
FIG. 2 is a perspective view illustrating a leadoxygen battery used as the DC power source in the system of FIG. 1 wherein the battery box is shown cut away to further illustrate the individual battery cells therein.

FIG. 2 shows the details of battery 14 which preferably is a lead-oxygen battery constructed in accordance with the present invention comprising a battery box A shown with parts cut away for purposes of clarity and a plurality of semi-sealed battery cells B contained in the battery box. An atmosphere of oxygen is contained in the battery box at a pressure of, for example, 5 psi. The battery box would carry the three terminals 26, 28 and 20 (not shown) that are schematically illustrated in FIG. 1. A common manifold 60 connects an opening 62 in each battery cell through an outer wall of the battery box A to the delivery line connected to pump 32 for evacuating the excess oxygen from each battery cell during the charging operation for storage in tank 34. A suitable connecting member may be mounted at a manifold opening 64 in the wall of the battery box for connecting the delivery line from the manifold opening to the pump 32 so that the battery box may be removably connected in the system. Manifold pipe 56 connects the two-way valve 50 with the interior of the battery box A for delivering the stored oxygen when the valve 50 is in a first position. Manifold pipe 58 connects the two-way valve 50 with each individual battery cell B for delivering the returned water thereto when valve 50 is in a second operational position. The battery box A may be made of any suitable rubber or inert plastic material.

The individual lead-oxygen battery cell B includes a semi-sealed casing member 70 having carried thereon a pair of positive terminals 72 and 74, and a negative terminal 76. The terminals 72, 74, and 76 of each individual battery cell B are connected together in seriesparallel combinations inside the battery box to reach the required voltage and then the resulting positive and negative are connected respectively with the terminals 26, 28, and 20 externally carried on the battery box A. Thus, 72 is the positive charging terminal, 74 is the positive discharge terminal, and 76 is the negative terminal for each cell B. Also located within the case 70 is a small recombination electrode 78 which enters the case member 70 and protrudes therein for recombining with oxygen and small amount of hydrogen given off during the battery operation particularly during overcharge into water in a manner that will be more fully described later. A nonsintered teflon membrane member 80 forms part of the outer wall surface of the cell casing 70 for admitting oxygen to the interior of the cell while restricting the flow of fluid therefrom.

Figure 3:
FIG. 3 is a detailed sectional view of an individual battery cell taken on the line 3—3 of FIG. 2.

The detail of the interior of an individual battery cell B is best seen in the sectional view of FIG. 3 which is taken along the line 3—3 of FIG. 2. In the center of each cell is a positive electrode charging grid 82 which is preferably constructed by pressing lead granules over a metal grid, such as lead or nickel. A separation insulator member 83 is adjacent the positive charging grid for supporting the electrolyte in the cell and holding it in intimate contact with the grid members and provides a volume for gas to accumulate during charging. The separation insulator may be made of an inert porous paper such as cellulose and the like. Adjacent the separation insulator member is a negative electrode grid 84 which is constructed of a suitable metal grid such as lead or nickel on which is pressed a layer 88 of powdered lead. A second separation insulator member 90 is interposed between the negative electrode member and a positive discharging electrode member 92. This positive electrode is usually a metal screen or charge collector, such as lead or nickel. The teflon membrane 80 is intimately attached to the positive discharge electrode 92. A suitable catalytic material 94, such as finely divided carbon, is carried on the teflon membrane 80 between the teflon membrane and the positive discharging electrode for ionizing the oxygen as it passes through the teflon membrane so as to go into solution with the electrolyte which may be sulfuric acid. The teflon membrane effectively contains the electrolyte solution preventing it from flowing outwardly from the cell. A corrugated or honeycomb compatible metal configuration 96 is usually placed between cells to allow easy entrance of oxygen to the cells and as a means to remove heat from the cells. It also serves during cell stacking to hold the positive electrode (teflon, catalyst, screen) in intimate contact with electrolyte in the spacer for better electrolyte contact and improved cell operation.

A significant weight reduction is accomplished by omitting the solid lead peroxide plate used as the positive electrode in a conventional lead-acid battery and substituting the lead positive screen member 92, catalyst 94, and the teflon membrane 80 as used with oxygen in accordance with the present invention.

The above description of the interior of the battery cell B includes only one-half of the cell. As can be seen in the detail drawing of FIG. 3, an exact duplicate of the above described cell is provided on the other side of centrally located positive charging grid 82. Thus, the complete cell is a mirror image of itself without the central positive charging grid. A negative electrode grid member 84 would be provided on each side of the central charge grid member 82, and the pair would be connected internally of the semi-sealed case 70 to each other and to negative terminal 76 carried on the exterior of case 70. In the same manner a pair of positive discharge screen members 92 would be connected internally within each case member 70 to the external terminal 74, and, accordingly, the positive charging grid member 82 would be connected to the external positive charging terminal 72. In this manner a complete cell B is formed in accordance with the present invention.

In a conventional battery cell, such as a lead-acid battery, a single positive terminal is normally used for both the charging and discharging operation. When the battery is charged through the positive terminal sulfation occurs and the positive electrode loses particles of material that drop to the bottom of the battery, causing the positive electrode to slowly erode and be the failure mode of the battery. Thus, the lead-oxygen battery, constructed in accordance with the present invention, eliminates this problem by providing a separate positive charging terminal which is used only for the charging operation. In addition, the special positive discharge electrode connected with terminal 74 including positive discharging screen member 92 and the adjacent catalyst 94, would possibly be damaged if the battery cell B were charged through the terminal 74.

OPERATION

The operation of the lead-oxygen battery power system constructed in accordance with the present invention will now be described so as to enable a full understanding thereof.

Charging

Referring to the schematic diagram of FIG. 1, the charge cycle is begun with the control valves in the following condition:

Valve 40 is closed, valve 48 is open, and two-way valves 44 and 50 are in their second positions so as to allow oxygen pressure in tank 34 to convey the water stored in the water accumulator 42 to the individual cells B through valves 44, 48, 50, and the manifold pipe 58. As soon as the water is returned to the battery cells, two-way valves 44 and 50 are returned to their first position for conveying oxygen to the battery box A through manifold pipe 56. However, the valve 48 is closed during charging to allow oxygen released during the charging operation to be stored in the tank 34 and not pass to the battery box A. Next, the two-way electrical switch 24 is placed in position a so as to connect the positive charging terminal 26 on the battery box with the charger device 10. The chemical action of the cell B during the charging operation would probably be as follows:

Negative electrode member 84:

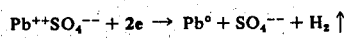

Positive charging grid 82:

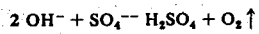

As each individual cell B begins to charge, oxygen is released and accumulates in the space 83 adjacent the positive charging grid member 82 and passes through the opening 62 into manifold 60. Also during charging, some water vapor possibly will be evaporated and will exit through 62 with the oxygen. The pump 32 provides a slight vacuum in each battery cell B which pulls the released oxygen through manifold 60 and pumps the oxygen through check valve 36 and the condensor 38 to the storage tank 34. Air cools the condensor fins 38 and the resulting condensate from the water vapor mixed with the oxygen drops into the water accumulator 42.

During the charging cycle, a slight amount of hydrogen is likely to be released. However, the recombination electrode 78 in each battery cell is provided to recombine such hydrogen with oxygen present in the cell to form water for restoring the water content of the electrolyte solution. The recombination electrode is particularly helpful if the battery is being overcharged which causes some hydrogen to be given off at the negative electrode member 84. The controller 16 regulates the charging current to protect the battery and when the battery is fully charged the controller switches the switch 24 to position b. It is important that water accumulated in 42 be returned to the battery immediately following each charging operation so that the water content and acidity level of the electrolyte solution is correctly restored before battery usage (discharging).

Discharging

During discharge, the controller 16 serves to regulate the output of voltage and current from the battery 14 as required by the varying load demand of the electrical apparatus such as motor 30, that is being driven. The control valves of the system are in the following condition during discharge: check valve 36 is closed, valve 48 is open, two-way valve 50 is in the first position and two-way valve 44 is in the first position, the valve 40 is closed. This condition of the valves allows oxygen stored in tank 34 to be delivered under a pressure of about 5 psi through regulator 46, valves 44, 48 and 50 to the interior of battery box A through manifold pipe 56. The oxygen which surrounds the individual cells B is admitted into each individual cell through the teflon membrane member 80 therein. Two-way valve member 44 being in position one prevents any water from passing from accumulator 42 to the battery 14 during discharge. The chemical action of the cell B during discharge would probably be following:

Negative electrode member 84:

$$Pb^\circ + SO_4^{--} \rightarrow PbSO_4 + 2e$$

Positive discharge electrode grid 92:

$$O_2 \rightarrow {}^c 2O + 4e \rightarrow 2\overline{\overline{O}}$$

$$H_2SO_4 + 2\overline{\overline{O}} \rightarrow H_2O + S\overline{\overline{O}}_4$$

The recombination electrode, discussed above, may include a hot wire extending into the interior of the battery case 70 made of platinum having a small external terminal 78 for electrically connecting the platinum wire. Other suitable constructions for the recombination electrode may include placing a platinum wire meshed screen inside the surface of the teflon membrane 80 or the use of finely divided palladium coated pellets placed inside the electrolyte solution. The use of the recombination electrode effectively reduces the problem of hydrogen being given off during certain operational cycles of the power system while also helping to restore water used in the cell by recombining any such hydrogen with oxygen present in the cell to form water.

It may be desirable to use a water level detector or other suitable metering means for determining that the correct amount of water is returned to each individual battery cell B from water accumulator 42 so that the acidity level of the electrolyte solution is maintained at about 35%.

Thus, it can be seen that a battery power system can be provided which is unique, closed-loop, self-contained, and highly efficient for supplying power to DC electrical apparatus. A significant weight reduction is accomplished by using a lead-oxygen battery which provides up to 35 watt-hours per pound whereas the conventional lead-acid battery normally delivers about 10 to 15 watt-hours per pound. The problem of having the positive electrode terminal gradually errode away due to repeated charging cycles is eliminated by providing a separate positive charging terminal and a separate positive discharge terminal. The positive discharging terminal constructed in accordance with the present invention contributes to the weight reduction of the system and utilizes the oxygen in the system to produce a highly efficient battery. The oxygen and water vapors released during the operation of the system are reclaimed and stored and are returned to the system at the appropriate operational cycle to conserve the resources used in the system.

What is claimed is:

1. A closed-loop electrical power supply system for supplying power to electrical equipment comprising:
   a. at least one lead-oxygen battery cell having a pair of positive terminals and a negative terminal;
   b. charging means supplying DC power for charging said battery cell;
   c. pump means connected to said battery cell for evacuating oxygen released from said battery cell during the charging thereof;
   d. storage means connected to said pump means for receiving said oxygen in such a manner as to store said oxygen;
   e. condensor means connected between said pump means and said storage means for cooling said oxygen causing moisture contained therein to condense into water;
   f. accumulator means for receiving and storing said water; and
   g. valve and valve control means for causing said water to be conveyed and returned to said battery cell following the charging thereof and for permitting oxygen from said storage means to be delivered and returned to said battery cell during the discharging of said battery cell;
   whereby a closed-loop, self-contained battery system is provided reclaiming and re-using gases given off during the operation thereof thus eliminating pollutive and dangerous fumes while enhancing the efficiency of the system.

2. The system of claim 1 wherein one of said positive terminals is used only for charging said battery cell and the other of said positive terminals is used only for discharging said battery cell.

* * * * *

UNITED STATES PATENT OFFICE
CERTIFICATE OF CORRECTION

PATENT NO. : 3,964,928

DATED : June 22, 1976

INVENTOR(S) : William J. Britz, William A. Boshers and James J. Kaufmann

It is certified that error appears in the above-identified patent and that said Letters Patent are hereby corrected as shown below:

In the heading of the printed specification, immediately after line 6 listing the names and addresses of the inventors, insert the following --

-- 73  Assignee:  The United States of America as represented by the Administrator of the National Aeronautics and Space Administration, Washington, D. C. --.

Signed and Sealed this

Sixteenth Day of November 1976

[SEAL]

Attest:

RUTH C. MASON
Attesting Officer

C. MARSHALL DANN
Commissioner of Patents and Trademarks